United States Patent [19]
Khouri et al.

[11] Patent Number: 5,391,616
[45] Date of Patent: Feb. 21, 1995

[54] POLYCARBONATE COMPOSITIONS COMPRISING THERMOPLASTIC OLEFIN COPOLYMERS

[75] Inventors: Farid F. Khouri, Clifton Park; Gregory J. Stoddard, Slingerlands, both of N.Y.

[73] Assignee: General Electric Company, Schenectady, N.Y.

[21] Appl. No.: 171,574

[22] Filed: Dec. 22, 1993

[51] Int. Cl.6 .................................. C08L 69/00
[52] U.S. Cl. .................. 525/67; 525/133; 525/148
[58] Field of Search ................ 525/67, 133, 148

[56] References Cited

U.S. PATENT DOCUMENTS

| | | | |
|---|---|---|---|
| 4,731,418 | 3/1988 | Dean | 525/205 |
| 4,864,002 | 9/1989 | Schuetz et al. | 525/204 |
| 4,996,263 | 2/1991 | Pyke et al. | 525/178 |
| 5,124,410 | 6/1992 | Campbell | 525/293 |
| 5,132,361 | 7/1992 | Shea et al. | 525/66 |
| 5,142,049 | 8/1992 | Khouri et al. | 544/218 |
| 5,153,290 | 10/1992 | Khouri et al. | 526/266 |
| 5,171,866 | 12/1992 | Khouri | 548/449 |
| 5,208,287 | 5/1993 | Dekkers | 525/68 |
| 5,212,255 | 5/1993 | Khouri et al. | 525/391 |

OTHER PUBLICATIONS

Grant & Hackh's *Chemical Dictionary* 5th Edition, p. 408, 1990.
Billmeyer "Textbook of Polymer Science", p. 237, 1962.
C. T. Meyer et al., Polymer Letters, 1978, vol. 19, Sep., "Preparation of Polydiene-g-Polystyrene Graft Copolymers", pp. 1106–1109.
Fowler et al., Polymer Engineering and Science, Mid-Nov., 1988, vol. 28, No. 21, "Rubber Toughening of Polystyrene Through Reactive Blending", pp. 1427–1433.

*Primary Examiner*—David Buttner
*Attorney, Agent, or Firm*—Edward A. Squillante; William H. Pittman

[57] ABSTRACT

Novel polycarbonate compositions comprising blends which contain thermoplastic olefin copolymers are prepared from precursor orthoester and orthocarbonate functionalized olefin polymers and functionalized polymers and the novel polycarbonate compositions display improved physical properties.

14 Claims, No Drawings

POLYCARBONATE COMPOSITIONS COMPRISING THERMOPLASTIC OLEFIN COPOLYMERS

FIELD OF THE INVENTION

This invention relates to novel polycarbonate compositions comprising blends which contain thermoplastic olefin copolymers. The thermoplastic olefin copolymer blends are prepared from precursor functionalized olefin polymers and functionalized polymers under reactive conditions. The resulting polycarbonate compositions unexpectedly display improved physical properties.

BACKGROUND OF THE INVENTION

Plastics are conventionally divided into two distinct and important groups: thermoplastics and thermosetting materials. Thermoplastics are those which melt to become viscous liquids when heated and solids when cooled. They are characterized by their flexibility as well as their ability to be repeatedly softened and hardened. Examples of common thermoplastics include acrylic, nylon, polyesters, polyvinyl chloride and polystyrene. Conversely, thermosetting materials are those which can only be heated and shaped once and, thus, they are not reworkable. Further, thermosetting materials are often hard, rigid, insoluble and infusable. Illustrative examples of such materials include phenolics, epoxies and unsaturated polyesters.

It is of increasing interest to prepare polycarbonate blends that comprise toughened thermoplastics since they are often employed in many commercial applications. Commercial methods for toughening thermoplastics usually involve blending into the plastic an elastomer having a low glass transition temperature. Often, however, the immiscibility and incompatibility of the elastomer with the thermoplastic produce poor physical properties in the blend. A compatibilization strategy is then required to improve physical properties. Said strategy typically involves incorporating copolymers prepared from the thermoplastic and the elastomer in the blend. The copolymer serves to improve rubber phase dispersion and adhesion, and thereby improves compatibility and physical properties of the blend.

An example of such polycarbonate blends is one which comprises acrylonitrile-butadiene-styrene (ABS) terpolymers. However, due to the presence of unsaturated polybutadiene rubber, these blends are susceptible to thermal and photochemical degradation. As a result of this, ABS has limited uses in outdoor applications.

Accordingly, the instant invention is directed to novel polycarbonate compositions comprising blends which contain thermoplastic olefin copolymers. Said thermoplastic olefin copolymers are prepared from reactions of ortho compound functionalized olefin polymers and acid, acid anhydride or thiol functionalized polymers. Additionally, in the instant invention, ortho compound is defined as orthoesters and orthocarbonates.

DESCRIPTION OF THE PRIOR ART

Graft copolymers derived from addition polymers and elastomers have traditionally been prepared by polymerizing an olefinic monomer in the presence of a rubber substrate and a free radical initiator. The graft reaction can be achieved in emulsion, suspension, solution or bulk processes. While such processes are widely used, they are not desirable since they disadvantageously require handling and disposing of monomers, solvent and reaction by-products.

Other investigators have focused on the preparation of addition polymer-rubber copolymers by melt processing amine functionalized addition polymers with functionalized elastomers since amines are known to react with a variety of electrophilic moieties including anhydrides, epoxides and alkyl halides. However, this method is not favored since amine-functionalized addition polymers are not available in bulk quantities for copolymer formation.

Finally, in commonly assigned U.S. application Ser. No. 08/160,133, thermoplastic olefin copolymers and blends comprising them are disclosed and in U.S. Pat. No. 5,153,290, polymers of ethylenically unsaturated cyclic orthoesters are disclosed, wherein said unsaturated cyclic orthoesters are prepared by reacting a hydroxy substituted cyclic orthoester with acryloyl chloride.

The instant invention is patentably distinguishable from the above-described since, among other reasons, it is directed to novel polycarbonate compositions comprising blends which contain thermoplastic olefin copolymers that are prepared by melt or solution reactions of ortho compound functionalized olefin polymers and acid, acid anhydride or thiol functionalized polymers, wherein said thermoplastic olefin copolymers comprise ester or sulfide olefin polymer to addition polymer linkages. Further, the novel polycarbonate compositions comprising blends which contain the above-described copolymers unexpectedly display desirable reduced gloss properties, improved tensile strengths, favorable heat deflection temperatures (HDT), improved melt flow indices, improved elongation values and notched Izod values of at least about 450 joules/M and preferably at least about 550 joules/M.

SUMMARY OF THE INVENTION

The instant invention pertains to novel compositions comprising a polycarbonate and blends which contain thermoplastic olefin copolymers wherein the copolymers comprise ester or sulfide olefin polymer to polymer linkages. The thermoplastic olefin copolymers are prepared by the reaction of ortho compound functionalized olefin polymers comprising structural units of the formula

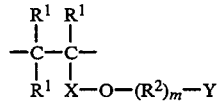

and a polymer having acid, acid anhydride or thiol functionality. Illustrative examples of the functionalized polymers include polyphenylene ether, polyphenylene sulfide and functionalized polymers of vinyl monomers such as polystyrene and acrylics.

Each $R^1$ is independently a hydrogen, lower alkyl ($C_1$–$C_5$ hydrocarbon), substituted or unsubstituted aromatic radical or a halogen and $R^2$ is —$CH_2$— or a substituted or unsubstituted divalent aromatic radical and m is greater than or equal to 1.

X is a substantially inert linking group and preferably is represented by groups of the formulae

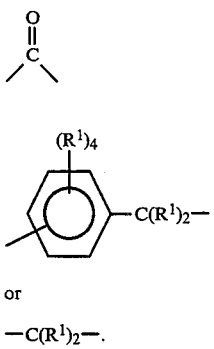

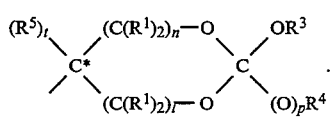

or

—C(R¹)₂—.     IV

Y is selected from the group consisting of cyclic orthocarbonates and cyclic orthoester moieties having the formula

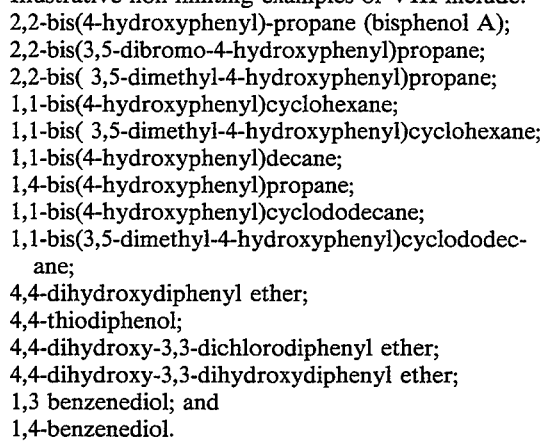

R³ is a $C_1-C_{10}$ primary or secondary alkyl or aralkyl or a $C_6-C_{10}$ aromatic radical or an alkylene radical forming a second 4 to 8 membered ring with C* thus producing a bicyclo compound. R⁴ is a $C_1-C_{10}$ primary or secondary alkyl or aralkyl or a $C_6-C_{10}$ aromatic radical. Further, R³ and R⁴ together with atoms connecting them can form a 4 to 8 membered ring thus producing a spirobicyclo compound. R⁵ is a hydrogen, alkyl or aryl. l is 0 or 1 and n is an integer from 0 to 2. p is 0 or 1 and t is 0 when R³ and C* form a bicyclo compound and is otherwise 1.

DETAILED DESCRIPTION OF THE PREFERRED EMBODIMENTS

The polycarbonate compositions of the instant invention may comprise structural units of the formulae $$-O-A^1-O-\overset{O}{\underset{\|}{C}}-\quad\quad VI$$

and

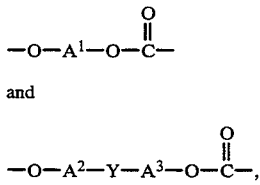

wherein A¹ is a divalent substituted or unsubstituted aliphatic, alicyclic or aromatic radical, preferably —A²—Y—A³— wherein A² and A³ are each independently a monocyclic divalent aromatic radical. Y is a bridging radical in which 1 to 4 atoms separate A² from A³ and VII is a preferred subgenus of VI.

The A² and A³ values may be unsubstituted phenylene or substituted derivatives thereof, illustrative substituents (one or more) being alkyl, alkenyl, alkoxy and the like. Unsubstituted phenylene radicals are preferred. Both A² and A³ are preferably p-phenylene, although both may be o- or m-phenylene or one o- or m-phenylene and the other p-phenylene.

The bridging radical, Y, is one in which one or two atoms, preferably one, separate A² from A³. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred units of formula VII are 2,2-bis(4-phenylene)propane carbonate units, which are derived from bisphenol A and in which Y is isopropylidene and A² and A³ are each p-phenylene.

The material represented by formula VIII $$HO-A^1-OH \quad\quad (VIII)$$

is the source of structural units of formula VI above; A¹ is as previously defined.

Illustrative non-limiting examples of VIII include:
2,2-bis(4-hydroxyphenyl)-propane (bisphenol A);
2,2-bis(3,5-dibromo-4-hydroxyphenyl)propane;
2,2-bis( 3,5-dimethyl-4-hydroxyphenyl)propane;
1,1-bis(4-hydroxyphenyl)cyclohexane;
1,1-bis( 3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether;
4,4-dihydroxy-3,3-dihydroxydiphenyl ether;
1,3 benzenediol; and
1,4-benzenediol.

Other useful dihydroxyaromatic compounds which are also suitable for use in the preparation of the above copolycarbonates are disclosed in U.S. Pat. Nos. 2,999,835; 3,028,365; 3,334,154 and 4,131,575, all of which are incorporated herein by reference. The preferred bisphenol is 2,2-bis(4-hydroxyphenyl)propane (bisphenol A).

The polycarbonates of the instant invention may be prepared by reacting bisphenols with a carbonate source such as phosgene or dimethyl carbonate using conventional techniques. These include melt polymerization, interfacial polymerization and interfacial conversion with bischloroformate followed by polymerization. Chain termination agents such as phenol may also be employed.

Preparation of functionalization monomers (ethylenically unsaturated cyclic ortho compounds) which are grafted to produce the functionalized olefin polymers employed in the invention is achieved by reactions between hydroxy-substituted orthoester and α,β-unsaturated acid chlorides to form unsaturated esters such as the methacrylate or acrylate type. The preparation is further illustrated by the following examples. Molecular structures of all products in Examples 1–3 were confirmed by proton and carbon-13 nuclear magnetic resonance spectroscopy.

EXAMPLE 1

A 5-liter 3-necked flask fitted with a mechanical stirrer, pressure equalizing addition funnel and nitrogen inlet was charged with 301 grams (2.03 moles) of 4-hydroxymethyl-2-methoxy-2-methyl-1,3-dioxolane, 514 grams (5.08 moles) of triethylamine and 2 liters of methylene chloride. The flask was immersed in an ice-water bath and 193.1 grams (2.13 moles) of acryloyl chloride was added over 50 minutes under nitrogen, with stirring. The mixture was stirred at room temperature overnight, filtered and the filtrate was washed twice with 2-liter portions of water, dried over magnesium sulfate, filtered and vacuum stripped. A free radical inhibitor, 3-t-butyl-4-hydroxy-5-methylphenyl sulfide, was added in the amount of 200 ppm. to the residue which was then distilled under vacuum. The desired 4-acryloyloxymethyl-2-methoxy-2-methyl-1,3-dioxolane distilled at 80°–85° C./0.5–1.0 torr.

EXAMPLE 2

The procedure of Example 1 was repeated, employing 281 grams (1.9 moles) of 4-hydroxymethyl-2-methoxy-2-methyl-1,3-dioxolane, 481 grams (4.76 moles) of triethylamine and 199 grams (1.9 moles) of methacryloyl chloride. The product, 4-methacryloyloxymethyl-2-methoxy-2-methyl-1,3-dioxolane, was collected at 80° C./0.4 torr.

EXAMPLE 3

The procedure of Example 1 was repeated, employing 21 grams (100 mmol.) of 4-hydroxymethyl-2-methoxy-2-phenyl-1,3-dioxolane, 25.3 grams (250 mmol.) of triethylamine, 9.5 grams (105 mmol.) of acryloyl chloride and 150 ml. of methylene chloride. The crude product was purified by column chromatography over basic alumina, using 15% (by volume) ethyl acetate in hexane as an eluant, to yield the desired 4-acryloyloxymethyl-2-methoxy-2-phenyl-1,3-dioxolane.

The functionalized olefin polymers employed in the instant invention may be prepared via co-extrusion of a large variety of graftable compounds and polyolefin. The extrusion techniques as well as the graftable compounds include those described in commonly assigned U.S. Pat. No. 5,153,290, the disclosure of which is incorporated herein by reference.

The polymers employed in this invention comprising acid or acid anhydride functionality are prepared by standard free radical polymerization techniques known to those skilled in the art. The functionalized vinyl monomer (such as functionalized polystyrene and acrylics), and optionally one or more conventional vinyl monomers are polymerized via bulk, suspension, emulsion or solution polymerization methods in the presence of a free radical initiator, such as azobisisobutyronitrile (AIBN) or benzoyl peroxide. Broadly, the functionalized vinyl monomer may comprise from about 0.1 to 100 mole percent of the total monomer feedstream; however, the operable concentration may depend upon the specific functionalized monomer. The polymers comprising thiol functionality are typically prepared by polymerization of vinyl mercaptan precursors as well as by the methods described in *Adv. Polym. Sci.*, Vol. 15, 1974, pp. 61–90.

The concentration of free radical initiator generally ranges from about 0.001 to about 1.0 weight percent based on total weight of monomers. A variety of organic solvents is suitable for the solution polymerization method and halohydrocarbons, such as methylene chloride; ketones such as methyl ethyl ketone and acetone; and aromatic hydrocarbons, such as toluene and ethylbenzene, are often preferred. The temperature of the free radical polymerization generally ranges from 40° C. to about 150° C. The resulting polymers employed in this invention possess a weight average molecular weight (as determined by gel permeation chromatography) typically ranging from about 40,000 to about 250,000.

The functionalized polymers employed in this invention are capable of reacting with the above-described functionalized olefin polymers to form thermoplastic olefin copolymers. The olefin polymers that are functionalized in accordance with the instant invention and suitable for forming such copolymers include elastomers that possess a glass transition temperature, Tg, less than about 0° C. and preferably less than about −20° C. Illustrative examples of suitable polyolefins include ethylene propylene diene comonomer (EPDM) rubbers, ethylene alkene rubbers such as poly(ethylene-copropylene), polydiene rubbers such as poly(butadiene). Additionally, functionalized polyacrylates such as poly(butylacrylate) may also be employed.

In a preferred example, a functionalized polymer in accordance with the instant invention designated styrene acrylonitrile-A (SAN-A), prepared by the copolymerization of styrene, acrylonitrile and an acid, acid anhydride or masked thiol functionalized vinyl monomer, is melt extruded with an EPDM rubber functionalized with a cyclic orthoester or carbonate as depicted by formula I to afford a novel EPDM-SAN copolymer. A typical example includes reacting SAN-A with an EPDM rubber functionalized with cyclic 2-methoxy-2-methyl-1,3 dioxolane to form a EPDM-SAN copolymer.

The reactions between functionalized polymer and the functionalized olefin polymers is conventionally conducted in the melt or in solution. The process of preparing the thermoplastic olefin copolymers of this invention, for instance by the melt, comprises mixing olefin polymers functionalized with cyclic orthoesters or orthocarbonates with the acid, acid anhydride or thiol functionalized polymer employed in this invention and melt reacting the mixture at a temperature ranging from about 170° C. to about 350° C. Preferably, the temperature ranges from about 200° C. to about 260 C. Typical melt processing techniques include continuous extrusion through a single screw or twin screw extrusion device, such as a Welding Engineers 20-mm. twin screw extruder, and melt reaction in a Helicone reactor or Brabender melt mixer. One skilled in the art will recognize that if extrusion is employed, the screw design, screw speed, and feed rate may vary.

The copolymer containing blends employed in the instant invention typically range from about 20 to about 90 weight percent, preferably from about 40 to about 80 weight percent, functionalized olefin polymer, and typically from about 80 to about 10 weight percent, preferably from about 60 to about 20 weight percent, functionalized polymer. Optionally, an unfunctionalized polymer such as SAN, may be added to the functionalized polymer and functionalized olefin. The concentration of unfunctionalized addition polymer typically comprises from about 0 to about 50 weight percent, preferably from about 0 to about 25 weight percent, based on the weight of the functionalized polymer. More preferably, no unfunctionalized polymer is employed.

The following additional examples are to further illustrate and facilitate the understanding of the invention. All products obtained may be confirmed by conventional techniques such as proton and carbon 13 nuclear magnetic resonance spectroscopy as well as infrared spectroscopy.

EXAMPLE 4

The synthesis of a styrene acrylonitrile addition polymer comprising 1.0 mole percent acrylic acid functionality was achieved by charging a 5L, 3-neck round bottomed flask equipped with a stirrer and thermometer with 800 mL (6.98 mol) styrene, 300 mL (4.56 mol) acrylonitrile, 8.29 g (115 mmol, 1 mole percent) acrylic acid, 3.83 g (23.3 mmol) AIBN and 1.5 L methyl ethyl ketone to produce a mixture. The mixture was then purged with nitrogen for 5 minutes and then stirred at 70° C. for 24 hours. The resulting viscous solution was cooled to room temperature and precipitated into methanol using a commercial blender. Polymer was isolated by filtration, washed with methanol and dried in a vacuum oven at 60° C. for 48 hours to afford 731 (73% isolated yield) of white powder, SAN-A. FTIR spectroscopy confirmed the incorporation of the acid monomer by the presence of the carbonyl absorbtion at 1730 cm$^{-1}$. Qualitative analysis of the FTIR spectra revealed an acrylonitrile concentration of 27 weight percent.

EXAMPLE 5

SAN comprising 1 mole percent acrylic acid as prepared in Example 4 was tumble mixed with orthoester functionalized EPDM and extruded in a twin screw extruder at 450° F. to produce an extrudate (EPDM, SAN and copolymer). The extrudate was cooled in a water bath, pelletized and dried for 4 hours at 80° C. Copolymer analysis was obtained from acetone extractions which dissolve away any unreacted SAN and leave behind unreacted EPDM and EPDM-SAN copolymer as insolubles. The analysis revealed high degrees of grafting and thus copolymer formation.

It is expected that isolated copolymers prepared by extrusion or solution polymerization may be mixed with additional unfunctionalized or functionalized SAN and EPDM and extruded under conditions similar to those described above in order to produce poly(acrylonitrile-EPDM-styrene) (AES) blends.

The instant blends may be prepared in situ in an extruder. Also, in the alternative, substantially pure copolymers may be prepared and isolated. Subsequent blends may be prepared by mixing the isolated copolymers with additional resins followed by extruding in a manner similar to the one described in Example 5.

The method for producing the polycarbonate compositions of the instant invention is not particularly limited, and the conventional methods are satisfactorily employed. Generally, however, melt blending methods are desirable. The time and temperature required for melt blending are not particularly limited, and they can properly be determined according to the composition of the material.

The temperature varies somewhat with the blending ratio of polycarbonate to blends which contain thermoplastic olefin copolymers, but it is generally within a range of 200° to 500° C.

Any of the melt blending methods may be used, if it can handle a molten viscous mass. The method may be applied in either a batchwise form or a continuous form. Specifically, extruders, Banbury mixers, rollers, kneaders and the like may be employed.

EXAMPLE 6

An extrudate was prepared by charging a twin screw extruder set at 400 rpm at a throughput of 12 lbs/hr and temperatures in the ranges of 90° to 260° C. with 64 parts bisphenol A polycarbonate (Mn 50,000), 20 parts SAN (Mn 35,000), 16 parts AES-2 (prepared from a two-step extrusion process employing 1 part SAN-A functionalized with 1 mole % acrylic acid and 4 parts EPDM functionalized with 1 mole % cyclic orthoester (as prepared in Example 1) to yield a 1:4 copolymer blend which was diluted with additional acid functionalized SAN to produce a 1:1 copolymer blend), 0.1 part bis(2,4-di-t-butyl)pentaerythritol diphosphite, 0.1 part 1,3,5-tris(3,5-di-t-butyl-4-hydroxybenzyl)isocyanurate and 0.5 part pentaerythritol tetrastearate. The extrudate was cooled in a water bath, pelletized and dried for 4 hours at 80° C. yielding a polycarbonate composition (A).

EXAMPLES 7-8

Polycarbonate compositions (B) and (C) were prepared in the manner described in Example 6 except that 16 parts AES-1 (prepared from a single step extrusion of 1 part SAN-A functionalized with 1 mole % acrylic acid and 1 part EPDM functionalized with 1 mole % cyclic orthoester to produce a 1:1 copolymer blend) was employed in lieu of AES-2 in the former and 16 parts acrylonitrile-butadiene-styrene (ABS) (50 parts butadiene/50 parts SAN with 60% grafted to rubber) was employed in lieu of AES-2 in the latter.

The polycarbonate compositions in the table which follows correspond to the compositions described in Examples 6-8. The data confirms polycarbonate composition formation as well as the new and unexpected results obtained in the instant invention.

| Polycarbonate Composition | Gloss (60°) | Tensile Strength (psi) at break | HDT (°C.) | Melt Flow Index (g/10 min.) | Maximum Elongation % at break |
|---|---|---|---|---|---|
| A | 58 | 7662 | 104 | 3.29 | 178 |
| B | 53 | 7454 | 106 | 3.19 | 126 |
| C (control) | 98 | 7309 | 110 | 1.88 | 109 |

What is claimed is:

1. A composition comprising
   (a) polycarbonate;
   (b) blends which contain thermoplastic copolymers wherein said copolymers are prepared by reacting
      (i) an orthoester or orthocarbonate functionalized polybutadiene or polyacrylate or olefin polymer comprising structural units of the formula

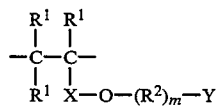

and each $R^1$ is independently a hydrogen, $C_1$–$C_5$ hydrocarbon, substituted or unsubstituted aromatic radical or a halogen and $R^2$ is —$CH_2$— or a substituted or unsubstituted divalent aromatic radical and m is any integer greater than or equal to 1 and X has the formulae

,

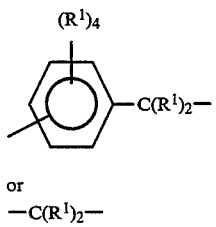

or

—C(R¹)₂— and Y is selected from the group consisting of moieties of cyclic orthocarbonates and cyclic orthoesters, with (ii) a polymer having acid, acid anhydride or thiol functionality.

2. A composition in accordance with claim 1 wherein said blends also comprise polyphenylene ether, polyphenylene sulfide, polystyrene or acrylic.

3. A composition in accordance with claim 1 wherein said cyclic orthocarbonate and cyclic orthoester moieties have the formula

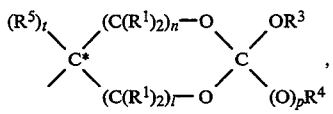

$R^3$ is a $C_1$–$C_{10}$ primary or secondary alkyl or aralkyl or a $C_6$–$C_{10}$ aromatic radical or an alkylene radical forming a second 4 to 8 membered ring with C* thus producing a bicyclo compound. $R^4$ is a $C_1$–$C_{10}$ primary or secondary alkyl or aralkyl or a $C_6$–$C_{10}$ aromatic radical. Further, $R^3$ and $R^4$ together with atoms connecting them can form a 4 to 8 membered ring thus producing a spirobicyclo compound and $R^5$ is a hydrogen, alkyl or aryl and l is 0 or 1 and n is an integer from 0 to 2 and p is 0 or 1 and t is 0 when $R^3$ and C* form a bicyclo compound and is otherwise 1.

4. A composition in accordance with claim 1 wherein said polymer is a functionalized polyphenylene ether, polyphenylene sulfide, polystyrene or acrylic.

5. A composition in accordance with claim 1 wherein said blend is prepared in the melt or solution.

6. A composition in accordance with claim 1 wherein said thermoplastic copolymer is an EPDM-SAN copolymer.

7. A composition in accordance with claim 1 wherein said polycarbonate is a homopolycarbonate.

8. A composition in accordance with claim 1 wherein said polycarbonate is a copolycarbonate.

9. A composition in accordance with claim 1 wherein said polycarbonate comprises structural units of the formula

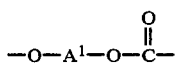

and $A^1$ is a divalent substituted or unsubstituted aliphatic, alicyclic or aromatic radical.

10. A composition in accordance with claim 9 wherein $A^1$ is —$A^2$—Y—$A^3$— and $A^2$ and $A^3$ are each independently a monocyclic divalent aromatic radical wherein Y is a bridging radical.

11. A composition in accordance with claim 10 wherein said polycarbonate is a bisphenol A polycarbonate.

12. A composition in accordance with claim 1 wherein said orthoester functionalized polymer is prepared with an unsaturated ester.

13. A composition in accordance with claim 12 wherein said unsaturated ester is an acrylate or methacrylate type ester.

14. A composition in accordance with claim 13 wherein said acrylate or methacrylate type ester is 4-acryloyloxymethyl-2-methoxy-2-methyl-1,3-dioxolane, 4-methacryloyloxymethyl-2-methoxy-2-methyl-1,3-dioxolane or 4-acryloyloxymethyl-2-methoxy-2-phenyl-1,3-dioxolane.

* * * * *